United States Patent
Clark et al.

(10) Patent No.: US 12,302,787 B2
(45) Date of Patent: May 20, 2025

(54) STATE-BASED MECHANISM FOR PERFORMING ENGINE REGENERATION PROCEDURE

(71) Applicant: DEERE & COMPANY, Moline, IL (US)

(72) Inventors: Scott N. Clark, Bettendorf, IA (US); Jason E. Haubenstricker, Davenport, IA (US); Aaron J. Geffre, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 589 days.

(21) Appl. No.: 17/192,255

(22) Filed: Mar. 4, 2021

(65) Prior Publication Data

US 2022/0279718 A1 Sep. 8, 2022

(51) Int. Cl.
*A01D 41/127* (2006.01)

(52) U.S. Cl.
CPC ....... *A01D 41/1274* (2013.01); *A01D 41/127* (2013.01); *A01D 41/1271* (2013.01); *A01D 41/1275* (2013.01)

(58) Field of Classification Search
CPC ...... F01N 3/023; F01N 9/002; F01N 2590/08; F02D 2200/0812; F02D 2200/604; F02D 41/029; F02D 41/08; A01D 41/00–1278
See application file for complete search history.

(56) References Cited

U.S. PATENT DOCUMENTS

| | | | |
|---|---|---|---|
| 8,261,539 B2 | 9/2012 | Abraham et al. | |
| 9,371,754 B2 | 6/2016 | Bloms et al. | |
| 2007/0271906 A1* | 11/2007 | Berke | F01N 9/002 60/285 |
| 2008/0208431 A1* | 8/2008 | Abraham | F01N 9/002 701/102 |

(Continued)

FOREIGN PATENT DOCUMENTS

| | | | | |
|---|---|---|---|---|
| GB | 2576295 A | * | 2/2020 | ......... A01D 41/1274 |
| JP | 2002045029 A | * | 2/2002 | |

(Continued)

*Primary Examiner* — John M Zaleskas
(74) *Attorney, Agent, or Firm* — Michael Best & Friedrich LLP (57) ABSTRACT

Systems and methods for performing an engine regeneration procedure in a work machine with an internal combustion engine are described. An electronic controller determines, based on information associated with one or more machine sensors and/or machine actuators, whether the work machine is in an idle state (e.g., a storage or non-harvesting state). In response to determining that the work machine is in the idle state, the electronic controller displays a user approval prompt on the display of an operator interface and performs the engine regeneration procedure in response to receiving a user input approving the engine regeneration procedure after displaying the user approval prompt. Conversely, in response to determining that the work machine is not in the idle state, the electronic controller performs the engine regeneration procedure without displaying the user (Continued)

approval prompt and without receiving any user input approving the engine regeneration procedure.

18 Claims, 5 Drawing Sheets

(56) References Cited

U.S. PATENT DOCUMENTS

| | | | |
|---|---|---|---|
| 2009/0198402 A1* | 8/2009 | Quigley | F01N 3/0238 701/31.4 |
| 2010/0089032 A1* | 4/2010 | Iwashita | B01D 53/9495 60/277 |
| 2010/0229538 A1* | 9/2010 | Bloms | F01N 9/002 60/295 |
| 2010/0275580 A1* | 11/2010 | Abraham | F01N 9/002 60/285 |
| 2012/0060483 A1* | 3/2012 | Renneke | B60W 50/0097 60/295 |
| 2012/0124979 A1* | 5/2012 | Noma | F02D 41/0205 60/311 |
| 2012/0330531 A1* | 12/2012 | Noma | F02D 41/029 701/102 |
| 2013/0074481 A1* | 3/2013 | Miura | F01N 9/002 60/311 |
| 2013/0133315 A1* | 5/2013 | Shibutani | F01N 9/002 60/311 |
| 2014/0250864 A1* | 9/2014 | Heinecke | A01D 41/127 60/311 |
| 2015/0369099 A1* | 12/2015 | Miyoshi | B01D 46/82 55/282.3 |
| 2016/0208665 A1* | 7/2016 | Koike | F01N 3/023 |
| 2016/0222858 A1* | 8/2016 | Iwata | B60K 35/00 |
| 2016/0302362 A1* | 10/2016 | Temple | A01D 41/1261 |
| 2017/0009634 A1* | 1/2017 | Shiomi | F02D 41/0245 |
| 2017/0260890 A1* | 9/2017 | Uehara | B60K 35/00 |
| 2017/0370266 A1* | 12/2017 | Togawa | F01N 3/36 |
| 2018/0347432 A1* | 12/2018 | Dutto | F01N 3/035 |
| 2020/0022305 A1* | 1/2020 | Gould | A01D 41/1208 |
| 2020/0056520 A1* | 2/2020 | Nishimoto | F01N 3/023 |
| 2023/0189708 A1* | 6/2023 | Hunt | G01F 23/296 460/1 |

FOREIGN PATENT DOCUMENTS

| | | | | | |
|---|---|---|---|---|---|
| JP | 2009171917 A | * | 8/2009 | | |
| JP | 2009257220 A | * | 11/2009 | | F01N 11/00 |
| JP | 2009257323 A | * | 11/2009 | | |
| JP | 2010265780 A | * | 11/2010 | | |
| JP | 2011190738 A | | 9/2011 | | |
| JP | 2012052433 A | | 3/2012 | | |
| JP | 2012102653 A | * | 5/2012 | | |
| JP | 2013113189 A | * | 6/2013 | | |
| JP | 2013124579 A | * | 6/2013 | | |
| JP | 2014029156 A | * | 2/2014 | | |
| JP | 2014190196 A | * | 10/2014 | | |
| JP | 2015010476 A | * | 1/2015 | | F01N 13/1805 |
| JP | 2015010478 A | * | 1/2015 | | A01D 41/1274 |
| JP | 2015121098 A | * | 7/2015 | | F01N 3/0238 |
| JP | 2019213511 A | * | 12/2019 | | |
| WO | WO-2014157283 A1 | * | 10/2014 | | F01N 13/1805 |
| WO | WO-2014208578 A1 | * | 12/2014 | | A01D 41/1274 |
| WO | WO-2014208663 A1 | * | 12/2014 | | F01N 11/00 |

* cited by examiner

STATE-BASED MECHANISM FOR PERFORMING ENGINE REGENERATION PROCEDURE

BACKGROUND

The present disclosure relates to systems and methods for operating a vehicle that uses an exhaust aftertreatment device (e.g., a diesel particulate filter).

SUMMARY

In one embodiment, the disclosure provides a system for operating a work machine with an internal combustion engine to perform an engine regeneration procedure. The system includes an electronic controller, an operator interface including a display screen, and one or more machine sensors and/or one or more machine actuators. The electronic controller is configured to determine, based on the machine sensors and/or machine actuators, whether the work machine is in an idle state (e.g., a "non-harvesting" state for a crop harvesting work machine). In response to determining that the work machine is in the idle state, the electronic controller displays a user approval prompt on the display of the operator interface and performs the engine regeneration procedure in response to receiving a user input approving the engine regeneration procedure after displaying the user approval prompt. Conversely, in response to determining that the work machine is not in the idle state, the electronic controller performs the engine regeneration procedure without displaying the user approval prompt and without receiving any user input approving the engine regeneration procedure.

In another embodiment the disclosure provides a method of performing an engine regeneration procedure in a work machine with an internal combustion engine. An electronic controller determines, based on information associated with one or more machine sensors and/or machine actuators, whether the work machine is in an idle state In response to determining that the work machine is in the idle state, the electronic controller displays a user approval prompt on the display of the operator interface and performs the engine regeneration procedure in response to receiving a user input approving the engine regeneration procedure after displaying the user approval prompt. Conversely, in response to determining that the work machine is not in the idle state, the electronic controller performs the engine regeneration procedure without displaying the user approval prompt and without receiving any user input approving the engine regeneration procedure.

Other aspects will become apparent by consideration of the detailed description and accompanying drawings.

DETAILED DESCRIPTION

Before any embodiments are explained in detail, it is to be understood that implementations are not limited in application to the details of construction and the arrangement of components set forth in the following description or illustrated in the following drawings. The systems and methods described herein are capable of other embodiments and of being practiced or of being carried out in various ways.

Figure 1:
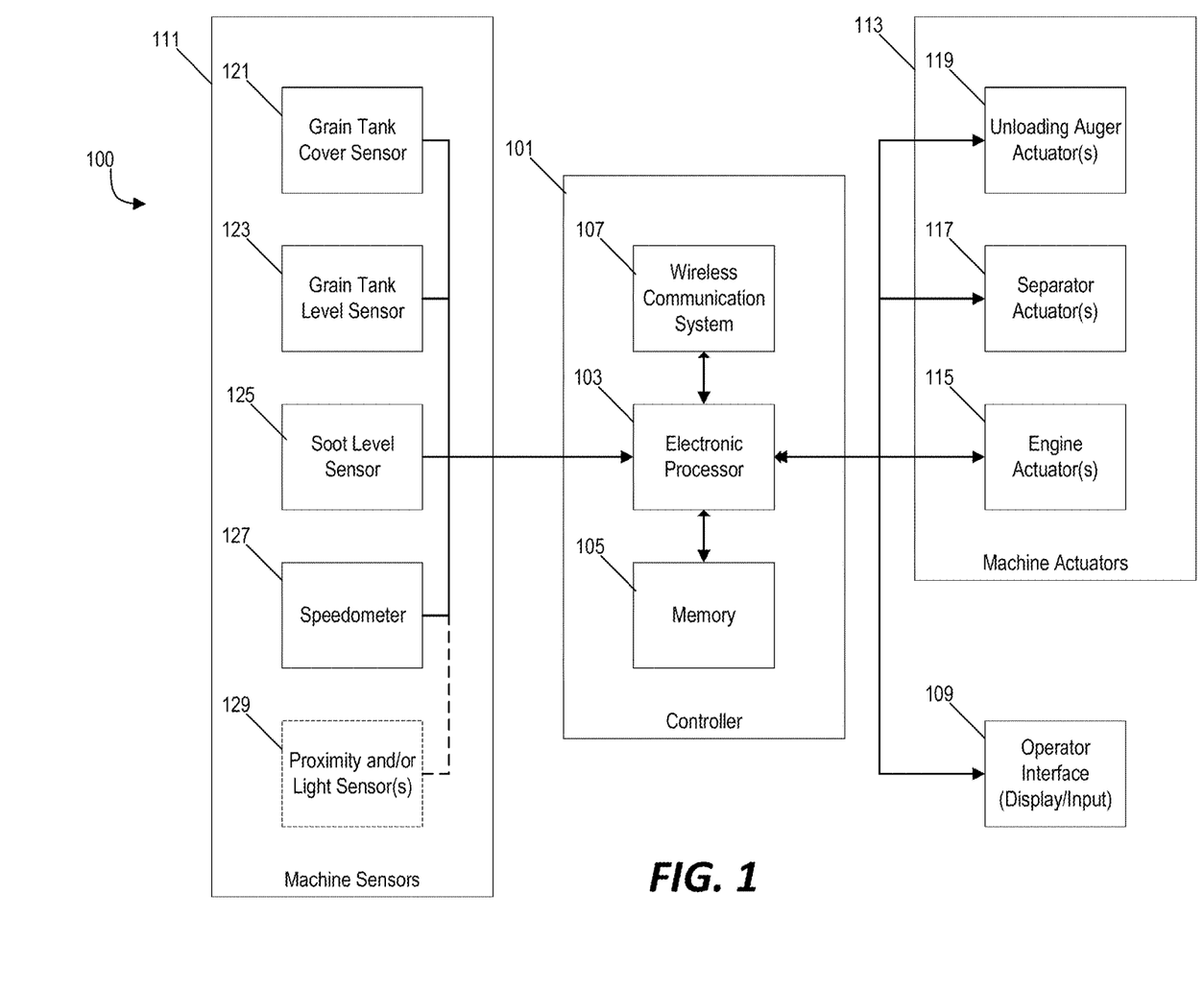
FIG. 1 is a block diagram of an example control system for a crop harvester according to one embodiment of the present disclosure.

FIG. 1 illustrates an example of a control system 100 for a crop harvester. The control system 100 includes a controller 101. The controller 101 is a computer system that includes an electronic processor 103 and a non-transitory computer-readable memory 105. The memory 105 stores data and computer-executable instructions that, when executed by the electronic processor 103, cause the controller 101 to perform one or more operations including those described herein below. The electronic processor 103 is communicatively coupled to the memory 105 and a wireless communication system 107 which facilitates wireless communication between the controller 101 and one or more remote computer systems (not pictured). In some implementations, the wireless communication system 107 may include, for example, a Wi-Fi transceiver, an RF (radio frequency) transceiver, and/or a cellular transceiver. The controller 101 is also communicatively coupled to an operator interface 109. In some implementations, the operator interface 109 includes at least one display and at least one input device (e.g., a keyboard, a pointing device, a touch-sensitive display, etc.). In some implementations, the operator interface 109 is positioned in an operator cab of the crop harvester and the controller 101 causes the operator interface 109 to display information to an operator of the crop harvester regarding the current operating status of the crop harvester. In some implementations, the controller 101 causes the operator interface 109 to display a graphical user interface that, in addition to displaying operating information, also presents notification messages, for example, in the form of "pop-up" windows.

The controller 101 is also communicatively coupled to a plurality of machine sensors 111 and a plurality of machine actuators 113. The machine sensors 111 are configured to sense and/or measure a condition of the crop harvester and to transmit signals to the controller 101 indicative of the sensed/measured condition. The machine actuators 113 control various operations of the crop harvester in response to control signals received from the controller 101. In the example of FIG. 1, the machine actuators 113 include, for example, one or more engine actuators 115 that control the operation of a diesel engine of the crop harvester; one or more separator actuators 117 that control the operation of a separator that separates collected crop from other materials; and one or more unloading auger actuators 119 that control the operation of an auger that unloads collected crop. In some implementations, the unloading auger is controllably pivoted to extend from the crop harvester while in use and to retract when not in use for more compact storage. In some implementations, this extension and retraction of the unloading auger is controlled by one of the unloading auger actuators 119. In the example of FIG. 1, the machine sensors 111 include, for example, a grain tank cover sensor 121 configured to generate an output signal indicative of whether the grain tank cover of the crop harvester is opened or closed; a grain tank level sensor 123 configured to generate an output signal indicative of a relative amount of grain in the grain tank as compared to a total capacity of the grain tank; a soot level sensor 125 configured to generate an output signal indicative of an amount of soot on a diesel particulate filter of the crop harvester; and a speedometer 127 configured to generate an output signal indicative of a motive travelling speed of the crop harvester.

It is noted that FIG. 1 is just one example of certain types of machine sensors 111 and machine actuators 113 that may be included in a crop harvester. In other implementations, the crop harvester may include other machine sensors 111 and/or other machine actuators 113 in addition to or instead of those illustrated in the example of FIG. 1. Similarly, in some implementations, the crop harvester may include more or fewer machine sensors 111 and/or machine actuators 113 than those illustrated in the example of FIG. 1. Finally, although the example of FIG. 1 and other examples described herein discuss the specific example of a crop harvester, in other implementations, the systems and methods described herein may be implemented in other types of work machines including, for example, a cotton harvester.

Some work machines that operate with an internal combustion engine, such as, for example, a crop harvester that uses a diesel engine, will occasionally undergo an engine regeneration process in which heat is produced (e.g., by the operation of the internal combustion engine) for maintenance of an exhaust aftertreatment device used by the work machine. For example, in some implementations, the engine regeneration procedure produces heat that is sufficient to "burn off" (e.g., oxidize) accumulated soot on a diesel particulate filter. In some implementations, the heat used for the regeneration process is produced by increasing the engine speed of the combustion engine in order to produce more heat than is be generated during normal operation of the combustion engine (e.g., when operating the crop harvester to harvest crops). For example, in some implementations, the temperature of the exhaust generated by the combustion engine of the crop harvester may be in the range of 100° C. to 300° C. when in the idle state and in the range of 300° C. to 500° C. during normal harvesting operation. However, the exhaust temperature may exceed 600° C. while performing the engine regeneration. In other implementations, the generated heat may be provided using a catalyst or applying heat from an additional heat source (e.g., resistive heating coils, microwave energy sources, etc.).

Accordingly, in some implementations, the control system 100 of FIG. 1 is designed and configured to check for objects and/or structures positioned in proximity to the exhaust vents/ports and other parts of the machine that may exhibit increased temperatures during an engine regeneration process. For example, in some implementations, the machine may be equipped with one or more proximity or light sensors 129 positioned at or near the components of the machine that will experience increased temperatures during regeneration. The proximity and/or light sensors 129 are communicatively coupled to the controller 101, and, in some implementations, the controller 101 may be configured to begin the engine regeneration process (e.g., altering the operation of the combustion engine to produce the elevated levels of heat) after verifying (based on the output signal from the proximity and/or light sensors 129) that no objects or structures are positioned near (e.g., within 2 meters of) the high temperature components of the machine.

Figure 2:
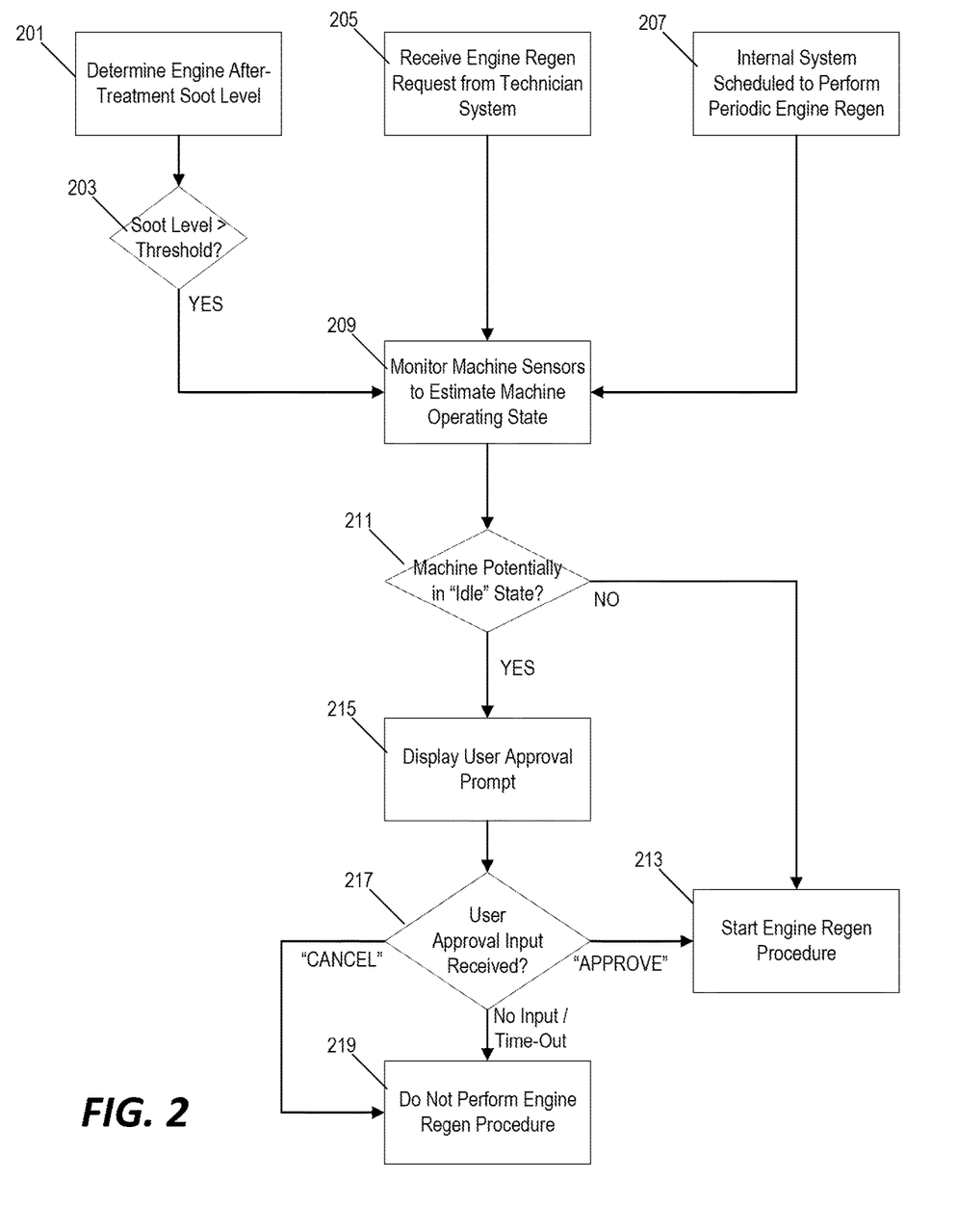
FIG. 2 is a flowchart of an example method for performing an engine regeneration process based on a determined operating state condition of the crop harvester using the control system of FIG. 1.

However, in some implementations, the one or more proximity and/or light sensors 129 are used solely for use in the engine regeneration process, and, as a result, the sensors 129 may experience extended periods of time of non-use. Omission of the proximity and/or light sensors 129 from the crop harvester may be preferred as doing so would reduce system complexity, improve functionality, and improve overall system reliability. The use of fewer components may result in reduced the need for component repair or replacement. FIG. 2 illustrates an example method for performing an engine regeneration process based on a state condition of the crop harvester machine. Accordingly, in some implementations, a dedicated proximity and/or light sensor 129 is omitted from crop harvester machines implementing the method of FIG. 2.

In the example of FIG. 2, the controller 101 is configured detect a triggering event or condition indicating that an engine regeneration process is to be performed. The example of FIG. 2 illustrates three examples of triggering events or conditions that the controller 101 may be configured to detect. First, the controller 101 is configured to monitor the output signal from the soot level sensor 125 to determine an engine after-treatment soot level (step 201) and a triggering condition is detected when the determined soot level exceeds a defined threshold (step 203). In a second way, the controller 101 is configured to receive, e.g., via the wireless communication system 107, a request to perform the engine regeneration process. In some implementations, the request to perform the engine regeneration is provided, for example, from a remote server or a portable device associated with a technician (step 205). In a third way, the controller 101, itself, is configured to perform the engine regeneration process periodically or according to a predefined schedule (step 207). These are three examples of triggering events/conditions that may cause the controller 101 to perform the engine regeneration process. In some implementations, the controller 101 may be configured to detect other triggering events or conditions in addition to or instead of the three ways illustrated in FIG. 2.

After detecting the triggering event or condition, the controller 101 determines whether to begin performing the engine regeneration procedure by monitoring one or more machine sensors 111 and/or machine actuators 113 to estimate a machine operating state (step 209). In some implementations, the crop harvester is more likely to be positioned near objects or structures that could be damaged by the heat generated during the engine regeneration process when the crop harvester is in an idle state (e.g., when the crop harvester is parked inside an enclosure for storage between uses). Accordingly, in some implementations, the controller 101 is programmed to determine, based on the status of other machine sensors and/or actuators, whether the crop harvester is in an idle state (step 211). In some implementations, the "idle state" refers to a state of the work machine when the work machine is not performing a primary function of the work machine. In the context of a crop harvester where the primary function of the crop harvester is a harvesting function, the idle state refers to a non-harvesting state in which the crop harvester may be returned to (or in the process of being returned to) a storage location (e.g., an indoor storage location). If the state determination indicates that the crop harvester is likely not in the idle state (i.e., the crop harvester is currently in an active operating state), then the controller 101 starts the engine regeneration procedure (step 213). In some implementations, a crop harvester is in an active operating state when the crop harvester is performing the primary function of the crop harvester, e.g., actively harvesting crop. However, if the state determination indicates that the crop harvester could be in the idle state, the controller 101 causes the operator interface 109 to display a user approval prompt (step 215).

As discussed in further detail below, the user approval prompt indicates to the operator that the engine regeneration procedure is to be performed, but has not yet begun (e.g., the controller 101 has not yet begun operating the combustion engine at increased engine speed to produce the elevated heat output). The user approval prompt further explains that, if the engine regeneration procedure is performed, some components of the crop harvester will exhibit elevated temperatures that could be damaging to nearby objects and structures. In response to the displayed prompt (step 217), an operator may provide an input to the operator interface 109 to "Approve" starting the engine regeneration procedure, in which case the controller 101 will start the engine regeneration procedure (step 213). Alternatively, an operator may provide an input to the operator interface 109 to "Cancel" the engine regeneration procedure, in which case the controller 101 will not perform the engine regeneration procedure (step 219). Similarly, if the operator does not provide any input in response to the user approval prompt, the controller 101 will also not perform the engine regeneration procedure (step 219). If the controller 101 does not start the engine regeneration procedure after displaying the user approval prompt (e.g., due to receiving a "cancel" input or receiving no input), then the controller 101, in some implementations, may attempt again to perform the engine regeneration procedure at another time (e.g., after the expiration of a defined delay period or upon determining, based on the machine sensors and/or actuators, that the crop harvester has transitioned into an operating state).

The method of operation in the example of FIG. 2 is based on the assumption that, if the crop harvester has actually entered an idle state (e.g., when the machine is brought into an enclosure, such as a shed, for storage), then an operator would not be at the operator interface 109 to see the user approval prompt or to provide a response. On the other hand, if the operation of the crop harvester has temporarily been halted for other reasons (e.g., the operator is waiting in the field for a new truck to receive the crops collected by the crop harvester), then the operator would likely be at the operator interface 109 to see the user approval prompt and to provide an affirmative input.

Figure 3:
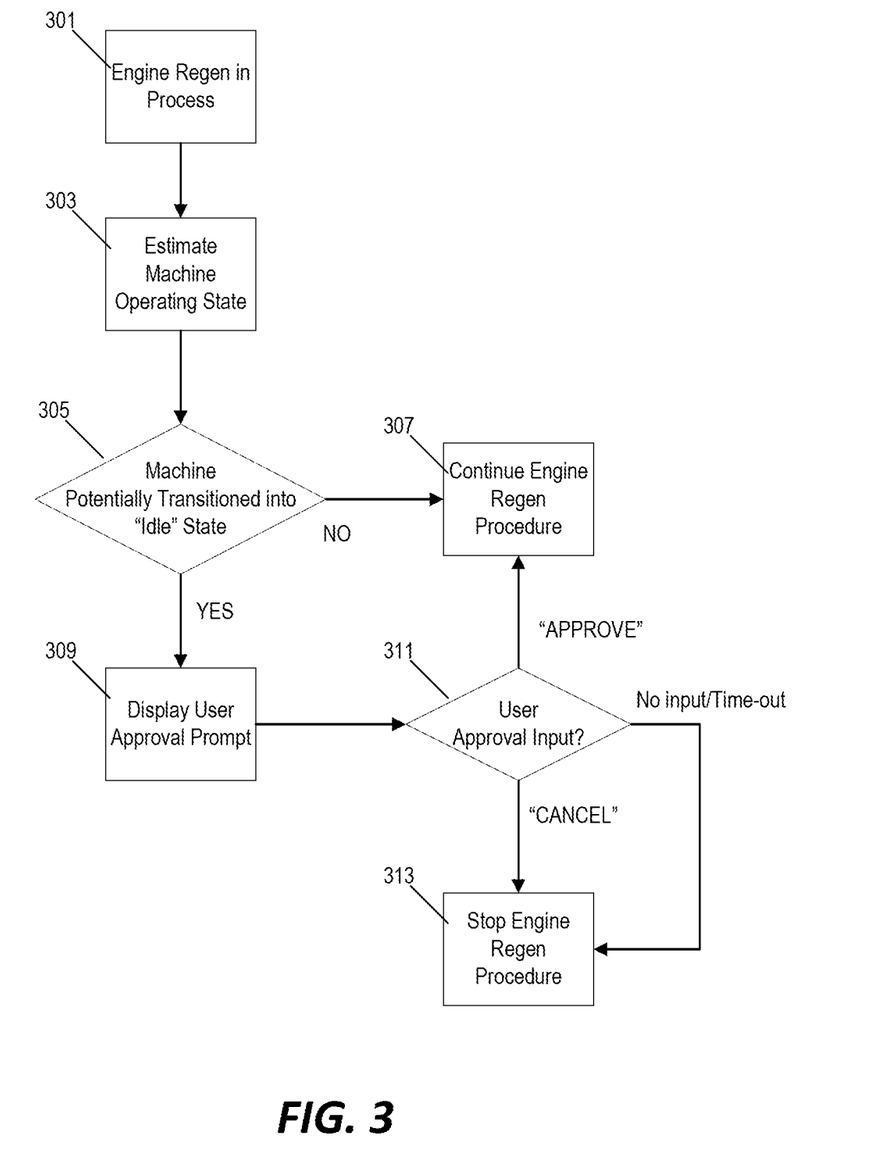
FIG. 3 is a flowchart of an example method for monitoring operating state condition of the crop harvester during performance of the engine regeneration process using the control system of FIG. 1.

In the method of FIG. 2, the controller 101 is configured to determine an estimated operating state of the crop harvester prior to starting an engine regeneration procedure. However, in some implementations, the engine regeneration procedure can take up to 45 minute or more to complete. Accordingly, it is possible that an engine regeneration procedure might be started while the crop harvester is in an active operating mode (e.g., a "harvesting" mode), but that the crop harvester might transition into the idle state before the engine regeneration procedure has completed. FIG. 3 illustrates an example method in which the state determination and user approval prompt functionality is extended to situations where such a state transition occurs during performance of an engine regeneration procedure.

While the engine regeneration procedure is in process (step 301), the controller 101 continues to estimate the machine operating state based on output signals from one or more machine sensors 111 and/or the operating state of one or more machine actuators 113 (step 303). If the state determination indicates that the crop harvester has not transitioned into the idle state (step 305), then the controller 101 continues the engine regeneration procedure (step 307). However, if the state determination indicates that the crop harvester has transitioned into the idle state (step 305) before completion of the engine regeneration procedure, then the controller 101 causes a user approval prompt to be displayed on the operator interface 109 (step 309). Similar to the example of FIG. 2, the user approval prompt, in some implementations, indicates to the operator that the engine regeneration procedure is in process and that the increased levels of heat can cause damage to nearby objects and/or structures. An operator can respond to the user approval prompt (step 311) by approving the continuation of the engine regeneration procedure or by cancelling the engine regeneration procedure. If the operator responds to the prompt with an approval, then the controller 101 continues the engine regeneration procedure (step 307). However, if the operator responds to the prompt by cancelling the engine regeneration, then the controller 101 stops the engine regeneration procedure (step 313). Additionally, the controller 101 may also be configured to stop the engine regeneration procedure (step 313) if no user input is received in response to the user approval prompt. For example, in some implementations, the regeneration procedure is canceled automatically if a user input is not received within a selected period of time.

Figure 4:
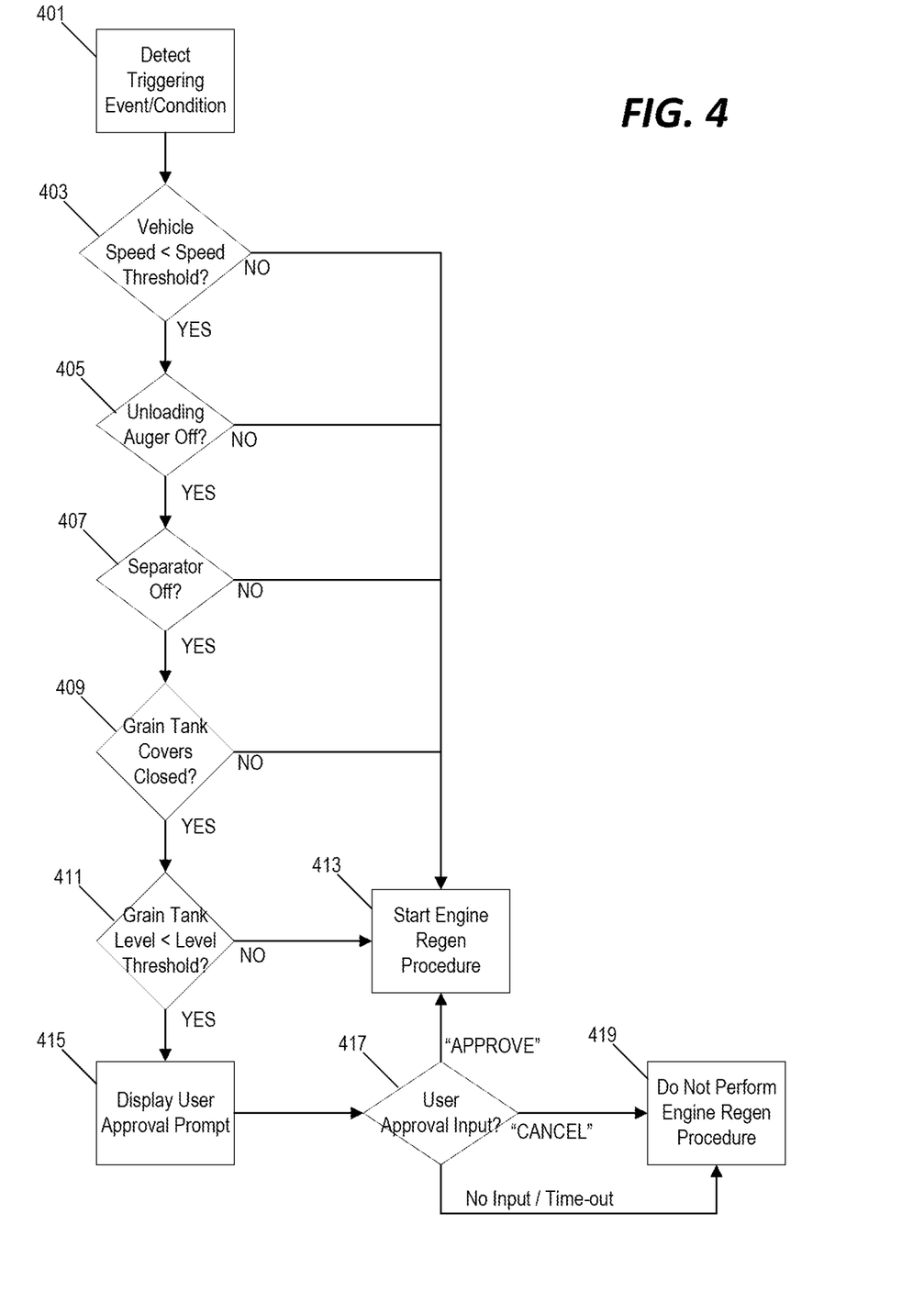
FIG. 4 is a flowchart of one example of a method for determining the operating state condition of the vehicle in the method of FIG. 2.

In various implementations, the controller 101 is configured to monitor the status of one or more different variables (based on the machine sensors 111 and the machine actuators 113) in order to determine whether the crop harvester is in the idle state. FIG. 4 illustrates one specific example of such a state determination. In response to detecting a triggering event or condition (step 401), the controller 101 determines, based on an output signal from the speedometer 127, whether the travelling speed of the crop harvester is below a speed threshold (step 403) (e.g., a speed threshold indicative of a stationary or nearly stationary vehicle). Next, the controller 101 determines, based on the control signal being sent by the controller 101 to the unloading auger actuator(s) 119, whether the unloading auger is in an "off" state (step 405). Similarly, the controller 101 determines, based on the control signal being sent by the controller 101 to the separator actuator(s) 117, whether the separator is currently operating (step 407). The controller 101 also determines, based on the output signal from the grain tank cover sensor 121 and the grain tank level sensor 123, whether the grain tank covers are currently closed (step 409) and whether the grain tank is currently filled to a defined level threshold (step 411).

If the travelling speed of the crop harvester is greater than the threshold, then it is unlikely that the machine is in the idle state. If the unloading auger and/or the separator are operating, then it is also unlikely that the crop harvester is in the idle (e.g., "non-harvesting") state. Conversely, if the grain tank covers of the crop harvester are closed while the grain tank level is at a reduced level (e.g., an amount of grain in the grain tank is at or below a selected level), then it is more likely that the crop harvester is in the idle (e.g., "non-harvesting") state. Accordingly, in the example of FIG. 4, the controller 101 is configured to start the engine regeneration process without displaying any user approval prompt (step 413) when the vehicle speed is greater than the defined threshold (step 403), the unloading auger is "on" (step 405), the separator is "on" (step 407), the grain tank covers are open (step 409), or the level of the grain tank contents is above a defined level threshold (step 411).

Conversely, the controller 101 causes the user approval prompt to be displayed on the operator interface 109 when the vehicle speed is below the threshold (step 403), the unloading auger is "off" (step 405), the separator is "off" (step 407), the grain tank covers are closed (step 409), and the level of the grain tank contents is below the level threshold (step 411), as the simultaneous occurrence of these five criteria indicates to the controller 101 that the crop harvester is in the idle state. Again, in response to displaying the user approval prompt (step 415), the controller 101 may receive an "approve" input or a "cancel" input, or might receive no input (step 417). In response to receiving an "Approve" input, the controller 101 will start the engine regeneration procedure (step 413). However, in response to receiving a "cancel" input or receiving no operator input in response to the prompt, the controller 101 will not start the engine regeneration procedure (step 419) and may instead attempt to perform the engine regeneration procedure again later (e.g., after expiration of a define delay period or when the controller 101 determines that the machine has resumed harvesting operations and is likely no longer in the idle state).

The example of FIG. 4 provides just one example of criteria that controller 101 might be configured to consider in determining whether the crop harvester is in an idle state. In other implementations, the controller 101 may be configured to consider other criteria in addition to or instead of those described above in reference to FIG. 4. For example, in some implementations, the crop harvester may be configured so that the unloading auger retracts or pivots to a storage position when not in use. In some such implementations, the controller 101 may be configured to monitor an auger position sensor or an auger position actuator to determine whether the auger has been moved into the storage position and to consider the auger being in the storage position as a criterion indicative of the crop harvester being in an idle state.

Figure 5:
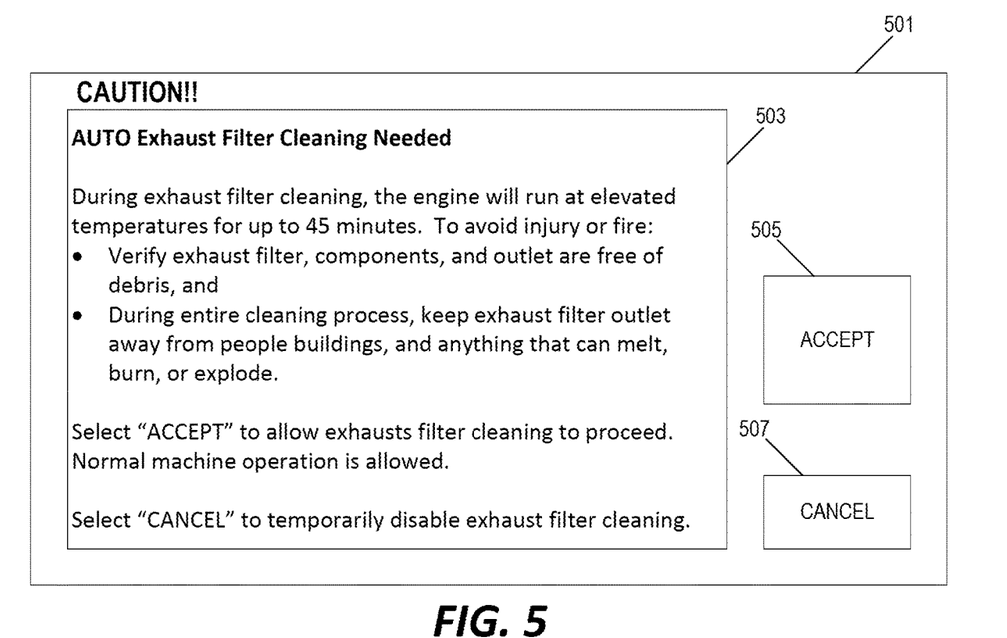
FIG. 5 is a user interface screen of an example of a user approval prompt displayed during the method of FIG. 2 and FIG. 4.
Figure 6:
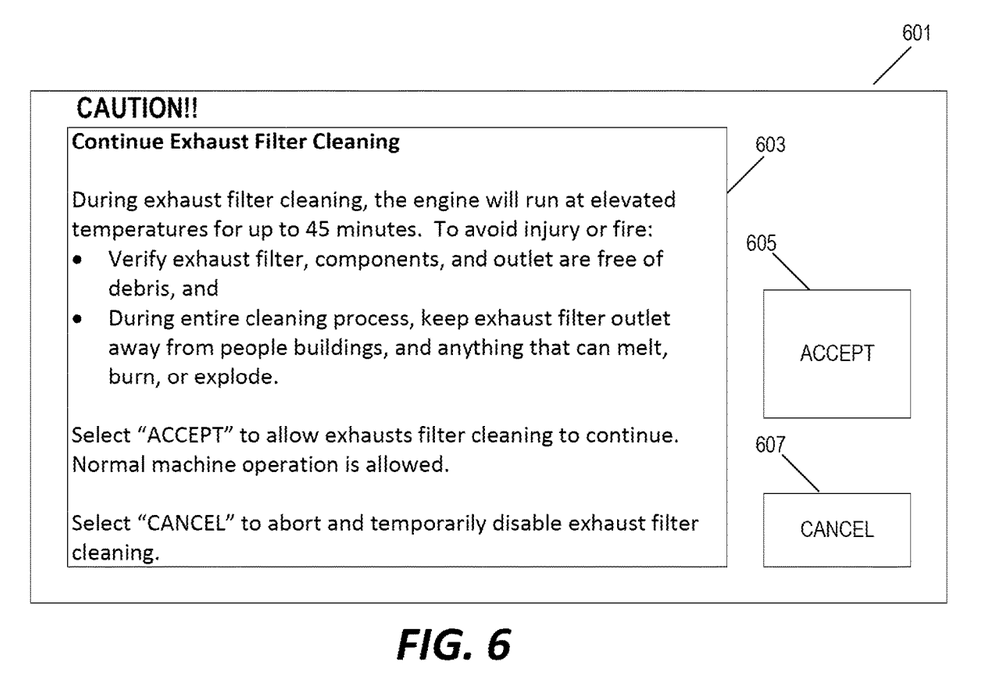
FIG. 6 is a user interface screen of an example of a user approval prompt displayed during the method of FIG. 3.

FIGS. 5 and 6 illustrate examples of a user approval prompt that may be displayed on the operator interface 109 in the examples of FIGS. 2-4. In some implementations, the user approval prompt 501 of FIG. 5 is displayed as a "pop up" window on the operator interface 109 before starting the engine regeneration procedure after determining that the crop harvester is in an idle state in the methods of FIGS. 2 and 4. The user approval prompt 501 includes a text section 503 that briefly explains the engine regeneration procedure and asks the operator to either "ACCEPT" or "CANCEL" the engine regeneration procedure. The user approval prompt 501 also includes an "ACCEPT" button 505 and a "CANCEL" button 507 by which an operator may provide a response to the user approval prompt 501.

In some implementations, the user approval prompt 601 of FIG. 6 is displayed as a "pop up" window on the operator interface 109 in response to determining that the crop harvester may have transitioned to an idle state while in the process of performing an engine regeneration procedure. Similar to the example of FIG. 5, the user approval prompt 601 includes a text section 603 that explains the engine regeneration procedure and asks the operator to either "ACCEPT" the continuation of the engine regeneration procedure or "CANCEL" the current engine regeneration procedure. The user approval prompt 601 also includes an "ACCEPT" button 605 and a "CANCEL" button 607 by which an operator may provide a response to the user approval prompt 601.

Accordingly, this disclosure provides systems and methods for operating a work machine with an internal combustion engine to perform an engine regeneration maintenance process by determining, based on one or more machine sensors or actuators, whether the work machine is in an idle state and displaying a user approval prompt before performing the engine regeneration process in response to determining that the work machine is in the idle state. Although some of the examples above are described in the specific context of a crop harvester, the systems and methods of this disclosure can also be implemented in other types of work machines.

What is claimed is:

1. A system for operating a work machine having a frame, an internal combustion engine supported by the frame, and a work machine component supported by the frame, the system comprising:
    an operator interface including a display screen; and
    an electronic controller configured to:
        determine, based at least in part on a rotational change in orientation of the work machine component relative to the frame, whether the work machine is in an idle state;
        display, on the display screen of the operator interface, a user approval prompt in response to determining that the work machine is in the idle state;
        perform an engine regeneration procedure in response to receiving a user input approving the engine regeneration procedure after displaying the user approval prompt; and
        perform the engine regeneration procedure without displaying the user approval prompt in response to determining that the work machine is not in the idle state.

2. The system of claim 1, wherein the electronic controller is further configured to determine whether the work machine is in the idle state based on a signal sent to a work machine actuator of the work machine.

3. The system of claim 1, wherein the work machine is a crop harvester, and wherein the work machine component is an unloading auger.

4. The system of claim 3, wherein the electronic controller configured to determine, based at least in part on a rotational change in orientation of the work machine component relative to the frame, whether the work machine is in an idle state, includes the electronic controller configured to determine, based at least in part on the unloading auger retracting from a first position to a second position, whether the work machine is in an idle state.

5. The system of claim 3, wherein the electronic controller configured to determine, based at least in part on a rotational change in orientation of the work machine component relative to the frame, whether the work machine is in an idle state, includes the electronic controller configured to determine, based at least in part on the unloading auger pivoting from a first position to a second position, whether the work machine is in an idle state.

6. The system of claim 1, wherein the work machine includes a speedometer, and wherein the electronic controller being configured to determine whether the work machine is in the idle state includes the electronic controller being configured to determine, in response to receiving an output signal from the speedometer, a traveling speed of the work machine relative to a defined speed threshold.

7. The system of claim 1, wherein the work machine is a crop harvester, wherein the electronic controller being configured to determine whether the work machine is in the idle state includes the electronic controller being configured to detect a level of collected crop in a grain tank of the crop harvester relative to a level threshold.

8. The system of claim 1, wherein the electronic controller is further configured to inhibit the engine regeneration procedure in response to receiving no operator input responding to the user approval prompt within a defined time-out period.

9. The system of claim 1, wherein the electronic controller configured to determine whether the work machine is in the idle state includes the electronic controller configured to determine, based on an output signal of a sensor indicating a temperature of exhaust gas generated by the internal combustion engine, the temperature of exhaust gas generated relative to a defined temperature range.

10. The system of claim 1, wherein the electronic controller is further configured to, prior to performing the engine regeneration procedure, determine whether an object is proximate to the work machine based on an output signal from a sensor indicating a distance of the object to the work machine and a defined distance threshold.

11. A method of performing an engine regeneration procedure in a work machine with an internal combustion engine, a frame, a work machine component, and an electronic controller, the method comprising:
   determining, by the electronic controller based at least in part on a rotational change in orientation of the work machine component relative to the frame, whether the work machine is in an idle state;
   displaying, on a display screen of an operator interface, a user approval prompt in response to determining that the work machine is in the idle state;
   performing the engine regeneration procedure in response to receiving a user input approving the engine regeneration procedure after displaying the user approval prompt; and
   performing the engine regeneration procedure without displaying the user approval prompt in response to determining that the work machine is not in the idle state.

12. The method of claim 11, wherein determining whether the work machine is in the idle state further includes determining whether the work component is operating.

13. The method of claim 11, wherein the work machine is a crop harvester, and wherein the work machine component is an unloading auger.

14. The method of claim 11, wherein determining whether the work machine is in the idle state includes determining, based on an output signal from a speedometer indicating a traveling speed of the work machine, the traveling speed relative to a defined speed threshold.

15. The method of claim 11, wherein the work machine is a crop harvester, wherein determining whether the work machine is in the idle state includes detecting an operating status of a separator of the crop harvester.

16. The method of claim 11, wherein the work machine is a crop harvester, wherein determining whether the work machine is in the idle state includes detecting a level of collected crop in a grain tank of the crop harvester relative to a threshold level.

17. The method of claim 11, further comprising temporarily inhibiting the engine regeneration procedure in response to the electronic controller receiving no operator input responding to the user approval prompt within a defined time-out period.

18. A method of performing an engine regeneration procedure in a work machine with an internal combustion engine, a frame, a work machine component, and an electronic controller, the method comprising:
   determining, by the electronic controller based at least in part on a rotational change in orientation of the work machine component relative to the frame, whether the work machine has transitioned into an idle state while the engine regeneration procedure is being performed;
   displaying, on a display screen of an operator interface, a user approval prompt in response to determining that the work machine has transitioned into the idle state while the engine regeneration procedure is being performed;
   continuing the engine regeneration procedure in response to receiving a user input approving the engine regeneration procedure after displaying the user approval prompt;
   aborting the engine regeneration procedure in response to receiving no operator input responding to the user approval prompt within a defined time-out period; and
   continuing the engine regeneration procedure without displaying the user approval prompt in response to determining that the work machine has not transitioned into the idle state while the engine regeneration procedure is being performed.

* * * * *